(12) United States Patent
Munafo et al.

(10) Patent No.: US 12,570,238 B2
(45) **Date of Patent: \*Mar. 10, 2026**

(54) MULTI-MODAL CONTEXT BASED VEHICLE THEFT PREVENTION

(71) Applicant: Intel Corporation, Santa Clara, CA (US)

(72) Inventors: Tamir D. Munafo, Naale (IL); Lital Shiryan, Ramat Gan (IL); Yuli Barcohen, Nokdim (IL); Varada Tarun Rao, Folsom, CA (US); Suraj Sindia, Hillsboro, OR (US)

(73) Assignee: Intel Corporation, Santa Clara, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/670,191

(22) Filed: May 21, 2024

(65) Prior Publication Data

US 2024/0343222 A1 Oct. 17, 2024

Related U.S. Application Data

(63) Continuation of application No. 17/840,470, filed on Jun. 14, 2022, now Pat. No. 12,024,124, which is a
(Continued)

(51) Int. Cl.
| | |
|---|---|
| *B60R 25/30* | (2013.01) |
| *B60R 25/24* | (2013.01) |
| *B60R 25/25* | (2013.01) |
| *G06F 21/31* | (2013.01) |
| *G06F 21/88* | (2013.01) |
(Continued)

(52) U.S. Cl.
CPC .............. *B60R 25/30* (2013.01); *B60R 25/24* (2013.01); *B60R 25/25* (2013.01); *G06F 21/316* (2013.01); *G06F 21/88* (2013.01); *G06N 3/042* (2023.01); *G06N 3/08* (2013.01); *G06N 3/088* (2013.01); *G06N 5/046* (2013.01); *G06F 2221/2111* (2013.01); *G06N 7/01* (2023.01)

(58) Field of Classification Search
CPC .......................... B60R 2325/205; B60R 25/33
See application file for complete search history.

(56) References Cited

U.S. PATENT DOCUMENTS

| | | | |
|---|---|---|---|
| 9,775,565 | B1 | 10/2017 | Berg-Neuman et al. |
| 9,896,062 | B1 | 2/2018 | Potter et al. |
(Continued)

OTHER PUBLICATIONS

"U.S. Appl. No. 15/394,678, Final Office Action mailed Apr. 4, 2018", 11 pgs.
(Continued)

*Primary Examiner* — Fabricio R Murillo Garcia
(74) *Attorney, Agent, or Firm* — Banner & Witcoff, Ltd.

(57) ABSTRACT

A motor vehicle management system provides theft prevention based on contextual information. The motor vehicle management platform includes sensing equipment that can provide input data to determine a context of the vehicle and an operator of the vehicle. The context can include location information of the motor vehicle and an identity of the operator of the motor vehicle. Based on permissions for the operator, the system can determine if a context of the vehicle violates permissions for the identified operator.

13 Claims, 8 Drawing Sheets

Related U.S. Application Data continuation of application No. 16/272,630, filed on Feb. 11, 2019, now Pat. No. 11,390,250, which is a continuation of application No. 15/394,678, filed on Dec. 29, 2016, now Pat. No. 10,202,103.

(51) Int. Cl.

| | |
| --- | --- |
| *G06N 3/042* | (2023.01) |
| *G06N 3/08* | (2023.01) |
| *G06N 3/088* | (2023.01) |
| *G06N 5/046* | (2023.01) |
| *G06N 7/01* | (2023.01) |

(56) References Cited

U.S. PATENT DOCUMENTS

| | | | |
| --- | --- | --- | --- |
| 12,024,124 B2 | 7/2024 | Munafo et al. | |
| 2006/0195483 A1 | 8/2006 | Heider et al. | |
| 2008/0245598 A1* | 10/2008 | Gratz | B60R 25/25 |
| | | | 701/469 |
| 2009/0153311 A1* | 6/2009 | Lee | B60R 25/2018 |
| | | | 340/426.1 |
| 2009/0284359 A1* | 11/2009 | Huang | B60R 25/24 |
| | | | 340/5.2 |
| 2012/0253607 A1 | 10/2012 | Choi | |
| 2013/0024060 A1 | 1/2013 | Sukkarie et al. | |
| 2013/0204943 A1 | 8/2013 | Ricci | |
| 2014/0129113 A1 | 5/2014 | Van Wiemeersch et al. | |
| 2014/0152422 A1 | 6/2014 | Breed | |
| 2014/0200737 A1 | 7/2014 | Lortz et al. | |
| 2014/0303836 A1 | 10/2014 | Phelan | |
| 2015/0057891 A1 | 2/2015 | Mudalige et al. | |
| 2015/0077235 A1* | 3/2015 | Pisz | G06F 3/017 |
| | | | 340/426.23 |
| 2015/0161836 A1* | 6/2015 | Park | G06F 21/36 |
| | | | 340/5.51 |
| 2015/0266451 A1 | 9/2015 | Oohara | |
| 2016/0012653 A1 | 1/2016 | Soroko | |
| 2016/0225203 A1* | 8/2016 | Asmar | G07C 9/00309 |
| 2016/0318481 A1 | 11/2016 | Penilla et al. | |
| 2016/0364812 A1 | 12/2016 | Cao | |
| 2017/0001527 A1 | 1/2017 | Prokhorov | |
| 2017/0057436 A1 | 3/2017 | Dow et al. | |
| 2017/0310679 A1 | 10/2017 | Childress et al. | |
| 2017/0349141 A1 | 12/2017 | Stefan et al. | |
| 2018/0037246 A1 | 2/2018 | Carter et al. | |
| 2020/0273268 A1 | 8/2020 | Bhattacharyya et al. | |
| 2021/0041879 A1 | 2/2021 | Fields et al. | |
| 2022/0379846 A1 | 12/2022 | Munafo et al. | |

OTHER PUBLICATIONS

"U.S. Appl. No. 15/394,678, Non Final Office Action mailed Dec. 5, 2017", 23 pgs.

"U.S. Appl. No. 15/394,678, Notice of Allowance mailed Oct. 3, 2018", 12 pgs.

"U.S. Appl. No. 15/394,678, Notice of Allowance mailed Oct. 3, 2018", 11 pgs.

"U.S. Appl. No. 15/394,678, Preliminary Amendment filed Jul. 26, 2017", 7 pgs.

"U.S. Appl. No. 15/394,678, Response filed Mar. 6, 2018 to Non Final Office Action mailed Dec. 5, 2017", 11 pgs.

"U.S. Appl. No. 15/394,678, Response filed Sep. 4, 2018 to Final Office Action mailed Apr. 4, 2018", 9 pgs.

"U.S. Appl. No. 16/272,630, Advisory Action mailed May 7, 2020", 5 pgs.

"U.S. Appl. No. 16/272,630, Advisory Action mailed Dec. 27, 2021", 5 pgs.

"U.S. Appl. No. 16/272,630, Final Office Action mailed Sep. 1, 2021", 11 pgs.

"U.S. Appl. No. 16/272,630, Final Office Action mailed Oct. 15, 2020", 12 pgs.

"U.S. Appl. No. 16/272,630, Final Office Action mailed Dec. 30, 2019", 14 pgs.

"U.S. Appl. No. 16/272,630, First Office Action mailed Jul. 25, 2019", 12 pgs.

"U.S. Appl. No. 16/272,630, Non Final Office Action mailed May 14, 2021", 12 pgs.

"U.S. Appl. No. 16/272,630, Non Final Office Action mailed Jun. 18, 2020", 11 pgs.

"U.S. Appl. No. 16/272,630, Non Final Office Action mailed Jul. 25, 2019", 12 pgs.

"U.S. Appl. No. 16/272,630, Notice of Allowance mailed Mar. 23, 2022", 13 pgs.

"U.S. Appl. No. 16/272,630, Preliminary Amendment filed Jun. 13, 2019", 3 pgs.

"U.S. Appl. No. 16/272,630, Preliminary Amendment filed Jun. 25, 2019", 6 pgs.

"U.S. Appl. No. 16/272,630, Response filed Feb. 1, 2022 to Advisory Action mailed Dec. 27, 2021", 9 pgs.

"U.S. Appl. No. 16/272,630, Response filed Feb. 16, 2021 to Final Office Action mailed Oct. 15, 2020", 8 pgs.

"U.S. Appl. No. 16/272,630, Response filed Apr. 30, 2020 to Final Office Action mailed Dec. 30, 2019", 11 pgs.

"U.S. Appl. No. 16/272,630, Response filed May 13, 2020 to Advisory Action mailed May 7, 2020", 10 pgs.

"U.S. Appl. No. 16/272,630, Response filed Aug. 16, 2021 to Non Final Office Action mailed May 14, 2021", 9 pgs.

"U.S. Appl. No. 16/272,630, Response filed Sep. 17, 2020 to Non Final Office Action mailed Jun. 18, 2020", 8 pgs.

"U.S. Appl. No. 16/272,630, Response filed Oct. 25, 2019 to Non Final Office Action mailed Jul. 25, 2019", 10 pgs.

"U.S. Appl. No. 16/272,630, Response filed Nov. 18, 2021 to Final Office Action mailed Sep. 1, 2021", 9 pgs.

"U.S. Appl. No. 17/840,470, Examiner Interview Summary mailed Dec. 1, 2023", 2 pgs.

"U.S. Appl. No. 17/840,470, Final Office Action mailed Oct. 13, 2023", 10 pgs.

"U.S. Appl. No. 17/840,470, Non Final Office Action mailed Jun. 23, 2023", 9 pgs.

"U.S. Appl. No. 17/840,470, Notice of Allowance mailed Feb. 21, 2024", 11 pgs.

"U.S. Appl. No. 17/840,470, Preliminary Amendment filed Sep. 22, 2022", 6 pgs.

"U.S. Appl. No. 17/840,470, Response filed Sep. 22, 2023 to Non Final Office Action mailed Jun. 23, 2023", 7 pgs.

"U.S. Appl. No. 17/840,470, Response filed Dec. 7, 2023 to Final Office Action mailed Oct. 13, 2023", 9 pgs.

"U.S. Appl. No. 17/840,470, Supplemental Amendment filed Jan. 9, 2024 to Final Office Action mailed Oct. 13, 2023", 6 pgs.

"First Office Action for U.S. Appl. No. 16/272,630, Mailed Dec. 5, 2017", 22 pgs.

"International Application Serial No. PCT/US2017/061625, International Preliminary Report on Patentability mailed Jul. 11, 2019", 13 pgs.

"International Application Serial No. PCT/US2017/061625, International Search Report mailed Jan. 31, 2018", 6 pgs.

"International Application Serial No. PCT/US2017/061625, Written Opinion mailed Jan. 31, 2018", 11 pgs.

* cited by examiner

200

400

500

600

CORRELATION MATRIX 900

| SENSOR TRIGGERS | TEMPERATURE | PRESSURE | TOUCHSCREEN ACTIVITY | PROXIMITY | MICROPHONE | GYRO | LOCATION FEED | SOCIAL MEDIA ACTIVITY |
|---|---|---|---|---|---|---|---|---|
| TEMPERATURE | 1.00 | -0.15 | 0.41 | 0.75 | -0.13 | 0.28 | 0.18 | 0.20 |
| PRESSURE | -0.15 | 1.00 | 0.04 | -0.23 | -0.22 | -0.30 | -0.24 | 0.37 |
| TOUCHSCREEN ACTIVITY | 0.41 | 0.04 | 1.00 | 0.66 | -0.19 | 0.13 | 0.46 | 0.31 |
| PROXIMITY | 0.75 | -0.23 | 0.66 | 1.00 | -0.16 | 0.43 | 0.28 | 0.25 |
| MICROPHONE | -0.13 | -0.22 | -0.19 | -0.16 | 1.00 | 0.17 | -0.12 | 0.12 |
| GYRO | 0.28 | -0.30 | 0.13 | 0.43 | 0.17 | 1.00 | 0.05 | 0.05 |
| LOCATION FEED | 0.18 | -0.24 | 0.46 | 0.28 | -0.12 | 0.05 | 1.00 | -0.04 |
| SOCIAL MEDIA ACTIVITY | 0.20 | 0.37 | 0.31 | 0.25 | 0.12 | 0.05 | -0.04 | 1.00 |

FIG. 9

MULTI-MODAL CONTEXT BASED VEHICLE THEFT PREVENTION

PRIORITY

This patent application is a continuation of, and claims the benefit of priority of U.S. patent application Ser. No. 17,840, 470, filed Jun. 14, 2022, which in turn claims the benefit of priority to U.S. patent application Ser. No. 16/272,630 filed Feb. 11, 2019, which in turn claims the benefit of priority of U.S. patent application Ser. No. 15/394,678 filed Dec. 29, 2016, now U.S. Pat. No. 10,202,103. The entire contents of these applications are incorporated herein in their entirety.

FIELD

Descriptions relate generally to vehicle management systems, and more particular descriptions relate to theft prevention based on contextual information.

COPYRIGHT NOTICE/PERMISSION

BACKGROUND

Motor vehicles are being equipped with more electronic equipment and more sensors. That trend is predicted to continue as manufacturers continue to increase the amount of automation and functionality provided in cars, trucks, and other vehicles. The increasing electronics provides significant improvements to entertainment systems, navigation, and driving. Networking motor vehicles allows remote contact to the vehicles for access to entertainment and help services. The increasing technology has also provided tracking and alerting systems that can monitor location of a car. These tracking technologies have been leveraged for post-theft tracking solutions, which are initiated after theft of the car has already taken place.

Despite technological increases in cars, technology systems referred to as "theft-prevention" systems often operate as theft recovery systems, allowing a response to theft of the vehicle. Currently the best methods for theft prevention are the same that have been around for a long time; namely, locking the doors, or using a steering wheel lock, or other similar mechanism.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 9 is a block diagram of an embodiment of a correlation matrix for computing a threat category for vehicle theft prevention based on context data.

Figure 1:
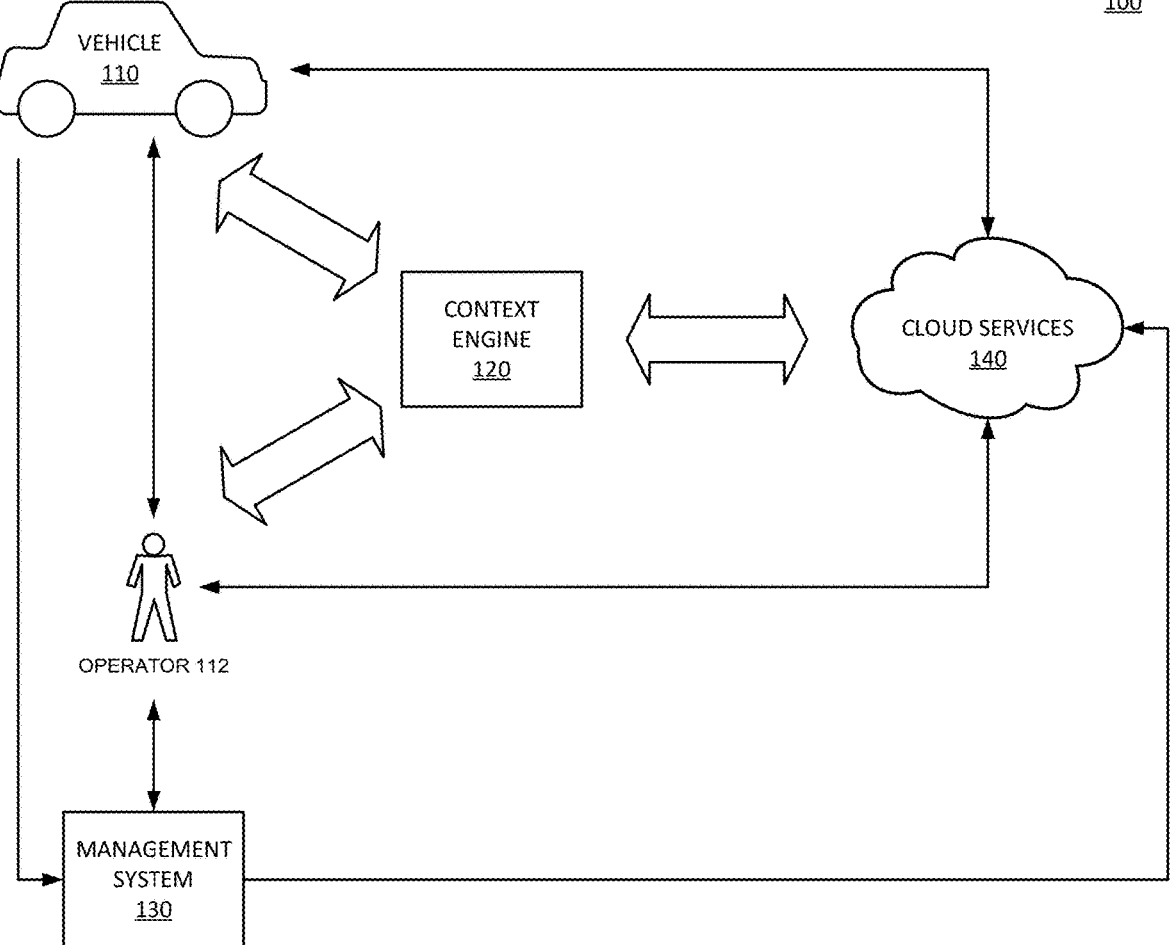
FIG. 1 is a block diagram of an embodiment of a system where a vehicle is managed in accordance with contextual information.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a motor vehicle management system provides theft prevention based on contextual information. The motor vehicle management system can leverage technology solutions to prevent unauthorized operation of the vehicle, and thus provide realtime theft prevention, rather than simply aiding in theft recovery. The motor vehicle technology platform includes sensing equipment that can provide input data to determine a context of the vehicle and information about an operator of the vehicle. The context can include location information of the motor vehicle and an identity of the operator. Based on permissions for the identified operator, the system can determine if a context of the vehicle violates permissions for the identified operator. When the context is outside the permissions, the management system can perform one or more operations that reduce the likelihood of theft.

The management system as described herein provides intelligence for theft prevention, rather than simply a non-intelligent solution or a system that can only react once triggered in response to a theft. The management system can generate and connect a car context with an operator or user context to make a smart, reliable, and immediate inference regarding operation of the vehicle. The electronics platform of a motor vehicle can refer to the processing and sensing hardware included in the vehicle. There are processing and sensing hardware components related to operation of the engine, fuel efficiency, and safety. Other processing and sensing equipment can include hardware to detect a context of the operator or user of the vehicle. Such processing and sensing equipment can be the same hardware already included in a car for other purposes, or can include additional equipment used to sense the operator context. In one embodiment, the management system accesses processing and sensing equipment to determine an operator context to provide a low power, always on solution for theft prevention of the motor vehicle.

It is increasingly common for car occupants to carry one or more identifying devices, such as mobile phones, smart watches, or other devices that identify a specific person. It will be understood that the identity of the actual user is beyond current sensing techniques that sense the presence of a key or key fob, which may be more easily hacked or spoofed. In one embodiment, the management system can connect to external sources of information, such as social media context (e.g., via information from one or more social networking applications or social network platforms), calendaring information, or other information or a combination, to identify where an operator is heading. Such information can operate as a baseline of expectation for the management system, which can then monitor for deviation from a predicted behavior. Deviation from a predicted behavior can provide more accurate decision-making than simply trying to identify likelihood of threat of a theft without such context.

Thus, as provided herein, a motor vehicle management system can identify a context of a motor vehicle and an operator or user, and compute expectations for the use of the motor vehicle based on the context. In one embodiment, the management system monitors for exceptions to the expected behavior to provide a higher level of security from theft. In one embodiment, the management system reports exceptions to the owner or primary operator of the vehicle. In one embodiment, the management system automatically performs one or more other theft prevention operations, such as reducing or disabling certain vehicle functionality. In one embodiment, the management system can "arm" a car for security or theft prevention without requiring the operator to actively set an alarm.

FIG. 1 is a block diagram of an embodiment of a system where a vehicle is managed in accordance with contextual information. System 100 illustrates an environment in which context can be utilized for improve theft prevention of a motor vehicle. Vehicle 110 represents a motor vehicle in accordance with any embodiment described herein. Vehicle 110 can be any type of motor vehicle, such as a sedan, van, minivan, sport utility vehicle, crossover, truck, or other type of vehicle. Vehicle 110 can be a commercial or consumer vehicle, can include a single axle or multiple axles.

Vehicle 110 includes management system 130, which includes computing or processing hardware on an in-device hardware platform. Such a platform can include hardware related to operator experience, including display and audio, and operational controls operated by the vehicle operator. Vehicle 110 can also include various processing and computing hardware and software to control driving operations, engine performance, and other functions that are not directly controlled by the operator. In one embodiment, the hardware platform of vehicle 110 can be considered to include components that are operator controlled as well as components that are not directly controlled by the operator.

System 100 includes context engine 120, which represents logic that determines a context for vehicle 110. In one embodiment, context engine 120 includes software executed on hardware that is within vehicle 110, such as part of management system 130. In one embodiment, context engine 120 includes software executed on hardware that is external to vehicle 110, and can be accessed via remote connections or links (e.g., a wireless connection). In one embodiment, context engine 120 includes dedicated hardware logic to perform operations to compute context, which can be hardware within vehicle 110 or hardware external to vehicle 110. Thus, context engine 120 can include hardware or software or a combination, which resides or executes on vehicle 110 or on server remote from vehicle 110 or a combination.

Cloud services 140 represent hardware and software that is separate from vehicle 110. In one embodiment of system 100, management system 130 of vehicle 110 gathers data and sends the data to cloud services 140. Cloud services 140 can compute context information from the data, which can affect one or more operations of vehicle 110, such as the ability to drive, the locking of doors, the generation of an alert, or other operation. In one embodiment, cloud services 140 includes a neural network analysis for context data. In one embodiment, the neural network is or includes a Bayesian network computation of sensor input data. In one embodiment, the neural network is or includes an unsupervised machine learning system that cross-correlates sensor inputs to compute a likelihood of threat, or a threat level.

Operator 112 represents a user or operator of vehicle 110. As used herein, an operator can be an authorized user of the vehicle, which is someone who is permitted to drive or otherwise operate vehicle 110, or can be an individual who is not authorized to drive or otherwise operate vehicle 110. An authorized operator 112 can be, for example, the car owner and others configured by the owner as authorized. A non-authorized operator 112 can be, for example, an individual attempting to perpetrate a crime with respect to the vehicle.

In one embodiment, an owner of vehicle 110 configures vehicle 110 to recognize various individuals, such as by pre-authorization. Such pre-authorization can identify the user and one or more permissions or one or more restrictions, or a combination, associated with the user. In one embodiment, operator 112 can be an authorized operator 112 with pre-authorization, such as by the inputting of a key code or use of another token. Such authorization can allow the temporary authorized use of vehicle 110 by operator 112, which otherwise might be considered non-authorized. In one embodiment, if operator 112 attempts to use vehicle 110 without proper authorization, context engine 120 identifies the state of unknown recognition of operator 112 and sends an alert to the owner of vehicle 110. If the owner approves of the use, context engine 120 can temporarily or permanently recognize the individual as an authorized user. While various examples and scenarios are provided, it will be understood that various other permutations of authorization and non-authorization can be applied to system 100 within the scope of what is described herein.

In one embodiment, context engine 120 or management system 130 or both store identification information for a list of defined or identified users. For the following descriptions, management system 130 will be considered to include or to include access to context engine 120. Thus, descriptions referring to operations by the management system can include operations performed by the context engine. The context engine may or may not be considered separate from the management system.

In one embodiment, an owner of vehicle 110 can define a user from a remote secure location such as a laptop or mobile device. In one embodiment, management system 130 identifies operator 112 devices the operator might carry (e.g., wearable devices, mobile phone, or other devices). The owner of vehicle 110 can pre-define the devices by unique ID of the device or via secure handshake or other mechanism. In one embodiment, management system 130 includes a driver facing camera that can provide facial recognition of operator 112 for determination of an identity of operator 112.

In one embodiment, management system 130 stores a profile or context for authorized users. Management system 130 can track the context of different operators 112 (e.g., via cloud computation, onboard context computing, or a combination) via the profiles. In one embodiment, the profiles include security profiles for contexts of the vehicle. In one embodiment, the profiles include personal profiles regarding preferences for a specific user, or other information which can provide a better user experience in the vehicle. In one embodiment, management system 130 tracks the location and time context of vehicle 110 through onboard sensing equipment, such as GPS (global positioning system) hardware, accelerometers, gyroscopes, or a combination. In one embodiment, management system 130 compares the context of vehicle 110 with a context or permission associated with operator 112 to identify when operation is within authorization. In one embodiment, management system 130 can generate an alert or other security violation operation in response to vehicle operation outside authorized use. Thus, management system 130 can identify exceptions to expected patterns or behaviors of vehicle 110, and can identify things that should not be happening with vehicle 110.

System 100 can bring intelligence to vehicle 110, especially from the perspective of theft prevention. Management system 130 can enable vehicle 110 to know who is allowed to drive it, and to determine in response to a use condition (such as whether the vehicle is turned on), if the use condition is expected. For example, an embodiment of system 100 can be thought to allow the car to determine if it makes sense for it to be turned on and going somewhere at a particular point in time. Management system 130 can track users using vehicle 110, can track the context of the vehicle and operator 112 via context engine 120, and can respond to changes in context that suggest an exception or threat. In one embodiment, management system 130 can access steering wheel locks, ignition cut off systems, throttle control, or other systems or a combination in response to detecting a threat condition.

In one embodiment, system 100 can enable vehicle 110 to have awareness of different contexts, such as predefined rules, and realtime detection of suspicious use cases. In one embodiment, with predefined rules, management system 130 can make inferences in various situations based on the rules. Management system 130 can be enabled to take one or more actions in response to the inferences. In one embodiment, not only does system 100 provide realtime threat detection, but can do so with fewer false positives based on rules and learning of behaviors associated with vehicle 110 and operators 112.

In one embodiment, an owner or primary user of vehicle 110 predefines rules and actions for vehicle 110. Such predefining can include, for example: 1) identification of anyone who is allowed to drive the car; 2) rules associated with each individual user (e.g., new drivers or teenagers may have restrictions not applied to adult users), such as a driving hours, parental consent, distance from home, or other rules or a combination; 3) preferences for alert or notification mechanisms, including who to alert; and, 4) definition of responses other than alert based on specific threat situations.

Consider the following example use cases. The following provide a small number of simple examples, which are not limiting. Other use cases may be more complex. There are too many use cases to be enumerated, but which can follow similar patterns of the vehicle management system identifying a context and either performing an operation in response to an exception or identifying a permissible exception.

In a first use case, consider that operator 112 is the owner of vehicle 110, and stops at the shopping mall in vehicle 110 on the way home from work. In one embodiment, management system 130 (e.g., via detecting the mall Wi-Fi network with a wireless sensor, or detecting a location via GPS hardware, or a combination) knows vehicle 110 is in the mall parking lot. Management system 130 can know infer that operator 112 is in the mall based on a signal from a device associated with the user leaving vehicle 110 once the vehicle was turned off, or through mall Wi-Fi, pedestrian navigation, or other sensor. In one embodiment, until operator 112 returns to the vehicle, management system 130 can determine that any ignition attempt, or any movement of the vehicle without an ignition attempt, represents a threat condition. In one embodiment, management system 130 generates an immediate notification with a warning or alert (e.g., to operator 112, or to a vehicle owner, or theft prevention service, or law enforcement, or a combination) to indicate a suspected theft event or other exception. Management system 130 can store information predefining such events or conditions.

Now consider the same scenario described above, but that while the car is in the parking lot a family member or other person arrives as pre-arranged to take vehicle 110 from the mall to somewhere else. In one embodiment, management system 130 identifies the second user as an authorized operator. In one embodiment, management system 130 generates a notification without a warning or alert, in contrast to the first use case. Management system 130 can make the inference that no threat condition is triggered based on sensing the context.

As one example of a context based rule, consider the following rule that a vehicle owner can generate: IF identified location=public space AND car is turned off AND user is away, THEN arm system for theft detection. Consider another example of a context based rule: IF car turned on AND (car operator is not in the authorized list OR is not identified) AND last known identified operator is still away, THEN take a defined action. In such an example, the management system can derive the context of the last known operator including whether the operator is away from the vehicle based on a device associated with the operator. The defined action can include initiating an alarm, shutting down the ignition system to prevent turning on the vehicle, calling someone, or taking other action, or a combination.

In a second use case, consider that an owner established known safe zones for operation of the vehicle. In one embodiment, when an operator drives the vehicle out of the known safe zone, management system 130 can automatically initiate higher security for operation of the vehicle, such as enabling window locking, auto-shading, initiating video monitoring on a rear-facing camera, or other actions or a combination. More details of an established safe zone are provided with respect to the description of FIG. 6.

In a third use case, consider that parent-owners of vehicle 110 define rules for car usage by their children. For example, if the child attempts to take the car out of the agreed-on times and locations, in one embodiment, management system 130 prevents the car from starting. In one embodiment, management system 130 allows the car to start, but initiates a monitoring policy or raises an alert, or both.

As one example of a context-based rules, consider the following: IF user identified is subject to restrictions for children THEN check specified rules (e.g., pre-defined). In one embodiment, management system 130 allows exceptions to specific rules. For example, while a normal rule may specify that a child may not drive the car past 23:00, the parent may provide an exception for a specific day that prevents the typical exception condition from triggering. Other examples of rules can include, for example: Children allowed to use vehicle between 16:00 and 23:00 within a given geographic space or distance; IF usage outside time or geography THEN take predefined action (such as notify the parent). As another rule example, consider: Children allowed to operate vehicle within a maximum speed (e.g., do not exceed 80 MPH); IF speed above limit THEN take predefined action.

In a fourth use case, consider conditions or events that automatically trigger the management system to increase security, such as: IF vehicle started with an exception detection THEN require two-factor authentication protocol to be initiated (e.g., identify user and also require a PIN number or identification code on a dashboard touchscreen). IF such two-factor authentication fails, allow immobilizer system to activate.

As provided herein, system 100 can enable user tracking and context tracking for vehicle 110, to enable system 100 to compute and act on an immediate inference of usage or theft. In one embodiment, system 100 provides theft deterrence or mitigation by adaptively responding to the current context of vehicle 110 with an appropriate level of security. Such deterrence and mitigation can be in addition to acting as a theft detection system.

In one embodiment, management system 130 can be considered to be or include a processing unit. The processing unit can either compute context information, or receive context information for action. In one embodiment, the processing unit receives data from one or more sensors (not explicitly shown) on the hardware platform for vehicle 110. In one embodiment, cloud services 140 includes a neural network executed on a remote server or server farm. In one embodiment, the neural network can perform a correlation analysis of sensor data and other context data.

Figure 2:
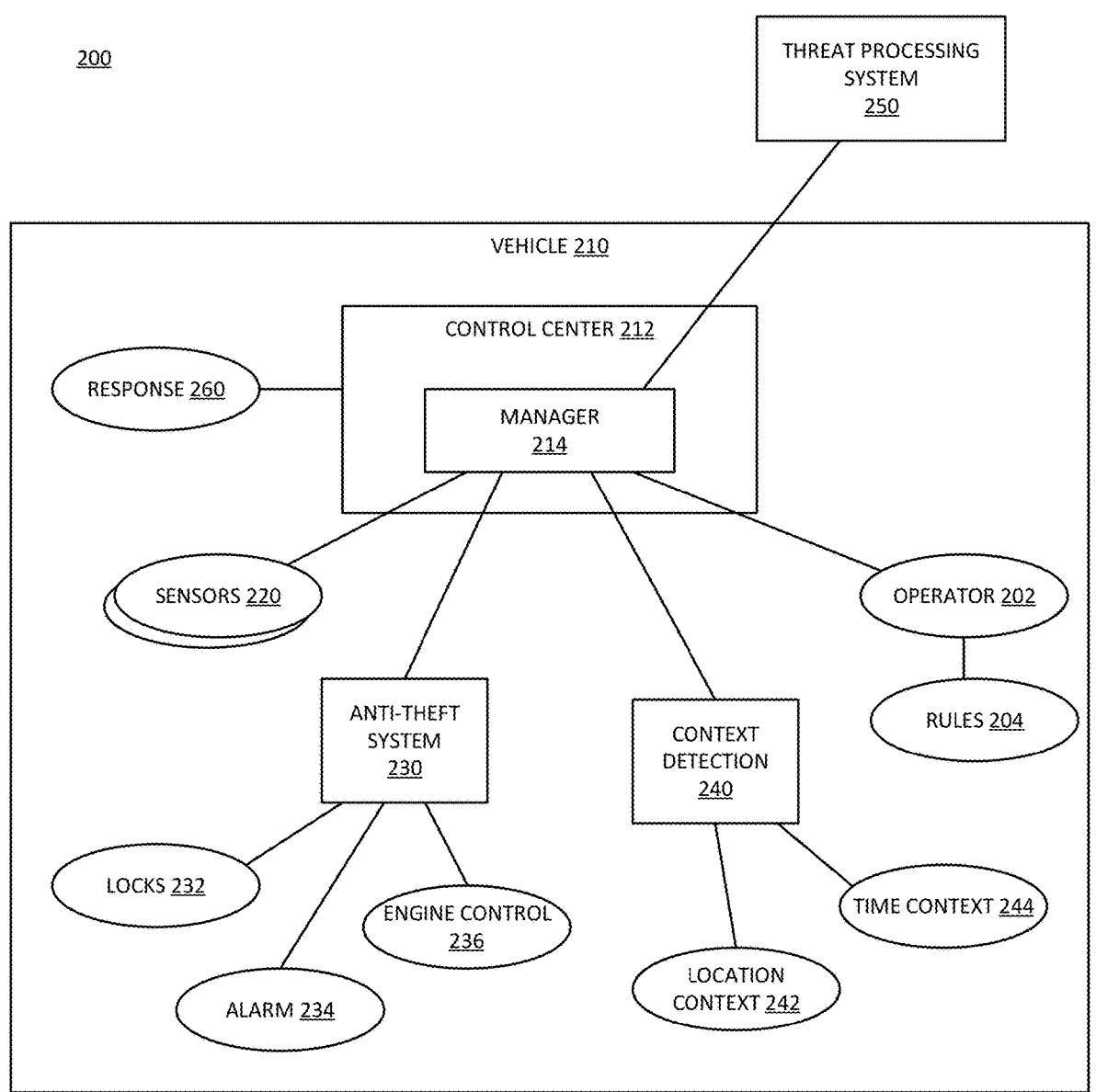
FIG. 2 is a block diagram of an embodiment of a vehicle management system that provides contextual management based on onboard sensor information.

FIG. 2 is a block diagram of an embodiment of a vehicle management system that provides contextual management based on onboard sensor information. System 200 provides one example of a system in accordance with an embodiment of system 100. Vehicle 210 represents elements of a motor vehicle, such as a motor vehicle in accordance with vehicle 110 of system 100.

Vehicle 210 includes control center 212, which represents processing components of a hardware platform of vehicle 210. Control center 212 can be considered a processing unit of vehicle 210 to collect context information and act on the context information. In one embodiment, control center 212 is or includes a vehicle management system. Control center 212 represents logic within vehicle 210 to receive sensor input, and provide management of user-controlled features. Control center 212 operates on the vehicle hardware platform, and may execute a vehicle operating system (OS). Manager 214 represents management logic of control center 212. In one embodiment, manager 214 represents an application or control software module of a vehicle OS that receives input from various sources, and generates one or more actions based on the inputs. The inputs can include, but are not limited to, the following.

Sensors 220 represent sensing equipment or components of vehicle 210. Sensors can include wireless signal sensors, GPS devices, cameras which may include hardware and software to perform facial or object recognition, accelerometers, gyroscopes, temperature sensors, dashboard monitors, local area network or wide area network hardware, proximity sensors, microphones, pressure sensors, light sensors, sensors to detect the open/closed state of windows or doors or both, biometric sensors, or other sensors, or a combination. In one embodiment, one or more sensors 220 provides data to a sensor hub, which provides data to manager 214. In one embodiment, manager 214 includes a sensor hub.

Anti-theft system 230 represents one or more mechanisms that can be part of vehicle 210 to perform anti-theft operations. Anti-theft system 230 refers to mechanisms that can be remotely enabled or to mechanisms that can be automatically enabled, or both. For example, anti-theft system 230 can include locks 232, which represent lock controls to lock and unlock the car. Alarm 234 represents one or more components that generate a sound in response to a theft event. Alarm 234 can additionally flash lights. Engine control 236 represents mechanisms that can disable a portion of the engine. For example, engine control 236 can include an ignition switch to prevent the car from being started. As another example, engine control 236 can include an engine cutoff switch to shut down the engine in response to a control signal.

Context detection 240 represents logic to determine a context based on input from sensors 220. Context detection 240 can include location context 242, which refers to a location of vehicle 210. Location context 242 represents the ability of system 200 to detect location information for vehicle 210, which can be performed based on one or more sensors 220, or based on external information from a remote server (not specifically shown), or a combination. Time context 244 can refer to a time of day, a day of the week, a time or date range, or other time, date, or calendaring indication, or a combination, which can be used to evaluate the application of rules for users of vehicle 210. In one embodiment, time context 244 can refer to information to indicate how long vehicle 210 has been in a specific location, how long an operator has been away from the vehicle, how long the vehicle has been turned off, or other information, or a combination. In one embodiment, location context 242 is informed by one or a combination of, GPS information, WiFi information, cellular data, or movement sensors. In one embodiment, time context 244 is informed by one or a combination of, clock information or calendar information, either or both of which can be indicated by network data.

In one embodiment, manager 214 identifies operator 202 based on information from one or more sensors 220. In one embodiment, operator 202 provides biometric information for identification by manager 214. In one embodiment, operator 202 provides a PIN (personal identification number) or other code. In one embodiment, control center 212 stores rules 204, which can be or include or be part of profiles or other authorization data associated with various operators 202. In one embodiment, control center 212 can store specific profiles for specific individuals. In one embodiment, control center 212 can store class profiles for classes of individuals (e.g., authorized users, teenage/restricted users, unknown users). Based on rule 204, manager 214 can determine permissions for operator 202. In one embodiment, permissions can be based on time context 244, location context 242, or a combination.

In one embodiment, system 200 includes threat processing system 250. Threat processing system 250 can be or include processing logic to compute the possibility that a threat condition exists based on input received by manager 214. In one embodiment, threat processing system 250 includes a neural network processing system that is networked with vehicle 210 (e.g., accessed as a cloud resource). In one embodiment, threat processing system 250 includes processing resources that reside on vehicle 210. In one embodiment, manager 214 provides sensor and context data gathered at vehicle 210 to threat processing system 250, which computes a likelihood that a threat condition or event exists, and provides information back to manager 214.

Based on the information provided by threat processing system 250, manager 214 can perform one or more operations (e.g., threat alert operations) in response to the detected condition. For contexts of vehicle 210 that are outside of rules 204, threat processing system 250 can determine that a threat condition exists, and manager 214 can execute a threat alert operation in response to the determination. Response 260 represents any one or more response operations that manager 214 can make based on a threat indication. Response 260 includes, but is not limited to, sending alerts or notifications, enabling security features of vehicle 210 (such as triggering a component of anti-theft system 230), or performing another operation, or a combination.

Figure 3:
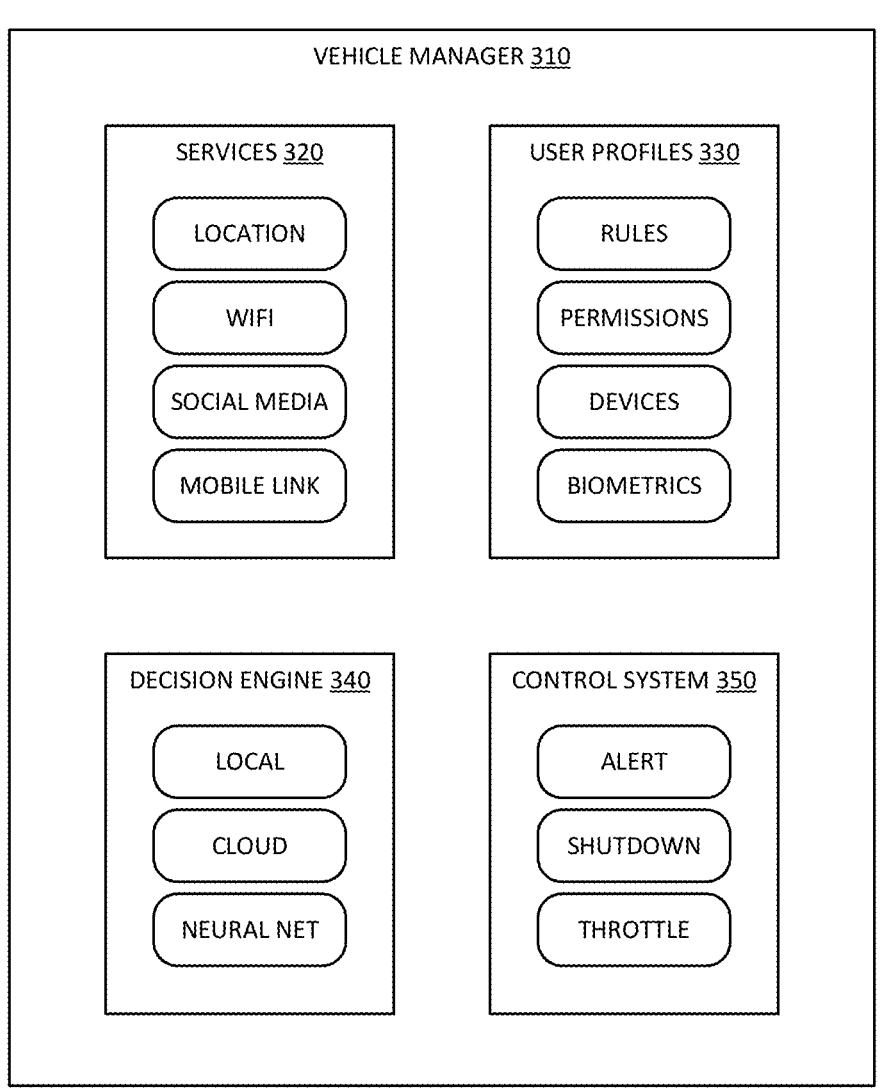
FIG. 3 is a block diagram of an embodiment of a vehicle management system that manages vehicle theft prevent based on vehicle and user context information.

FIG. 3 is a block diagram of an embodiment of a vehicle management system that manages vehicle theft prevent based on vehicle and user context information. Vehicle manager 310 represents a management system of a motor vehicle in accordance with any embodiment described herein. Manager 310 provides one example of a vehicle manager in accordance with an embodiment of manager 214 of system 200.

In general, manager 310 receives and uses data from sensors within the motor vehicle to identify context of an operator (e.g., someone attempting to use the motor vehicle), and location and time contexts of the motor vehicle. In one embodiment, manager 310 accesses social media information to determine who the operator is, and what rights or authorization the operator has with respect to the vehicle. In one embodiment, manager 310 accesses calendaring data from a user's online calendar information (such as through an email account or online service). With sensor data and potentially external data, manger 310 can determine context for the current moment for the vehicle, and set permissions or restrictions or both based on the determined context. In contrast to traditional theft prevention or in-car media interfaces, manager 310 can sense the context for the vehicle and operator.

In general, manager 310 can be considered to include a context detection system, a user management system, an alerting system, and a mechanism to compute the state of the vehicle and make determination of whether the state of the vehicle is expected or is an exception. The context detection system includes components to identify an operator, and at least time and place information for the vehicle. The time and place information can be absolute information or relative information (e.g., compared to a previous location), or both. The user management system can include identification of the user and rules or profiles for the user. The alerting system can include messaging systems or other signaling system to send a message in response to determination of a particular vehicle state. The mechanism to compute the state can include onboard processing units in the vehicle, and can include remote network resources (e.g., edge or cloud, or both).

In one embodiment, manager 310 accesses one or more services 320 for context information. Services 320 represent components that can be connected to, and have standalone operation from manager 310. For example, location services can include GPS or movement detection hardware that operates independently from manager 310. Manager 310 can interface with services 320 such as GPS by a service call or API (application programming interface) or other external request. In one embodiment, manager 310 includes a software development kit (SDK) that provides APIs to location services, social media, calendar information, and other web services or local services. A web service refers to a service accessed over a network. A service refers to a software module or routine that can be called or accessed, and provides an output or response or data in response to the call. The service may require input parameters, and return something based on the input parameters.

User profiles 330 represent profiles for individual users or classes of users. In one embodiment, manager 310 stores user profiles 330. In one embodiment, user profiles 330 are stored outside manager 310, and the manager accesses the profiles. User profiles 330 can include rules, permissions, or restrictions, or a combination for a user as an operator of the vehicle. In one embodiment, user profiles 330 can include associated biometrics data. In one embodiment, user profiles 330 can include information to identify one or more mobile or wearable devices associated with a user.

Decision engine 340 represents computational resources to determine context for an operator and for the vehicle, and to determine whether the context is within or outside of the permissions and rules of an associated user profile 330 for the user. In one embodiment, decision engine 340 includes computational resources within the vehicle, which can be referred to as computations at the edge, referring to an end-user resource of a network. In one embodiment, decision engine 340 includes cloud-based computational resources external to the vehicle, which can be referred to as computations at the cloud. In one embodiment, decision engine 340 is or includes a neural network analysis framework to compute a statistically most likely event or condition indicated by a given sample of sensor data and other context data.

Context sensing includes gathering data to determine what condition or state exists for the vehicle. In one embodiment, the decision or determination of what state or condition is indicated by certain sensor inputs and other data can be considered part of the context sensing. In one embodiment, the decision making can include the performing of machine learning to achieve context sensing.

In one embodiment, manager 310 executes one or more operations via control system 350 to respond to a computed condition based on the context. For example, control system 350 can enable generation of an alert, performing a shutdown operation, throttling a capability of the vehicle, or other operation, or a combination. In one embodiment, control system 350 includes an emergency override function. Such a function could be triggered by a physical key or pin, a code on a dashboard, or other emergency override trigger.

Figure 4:
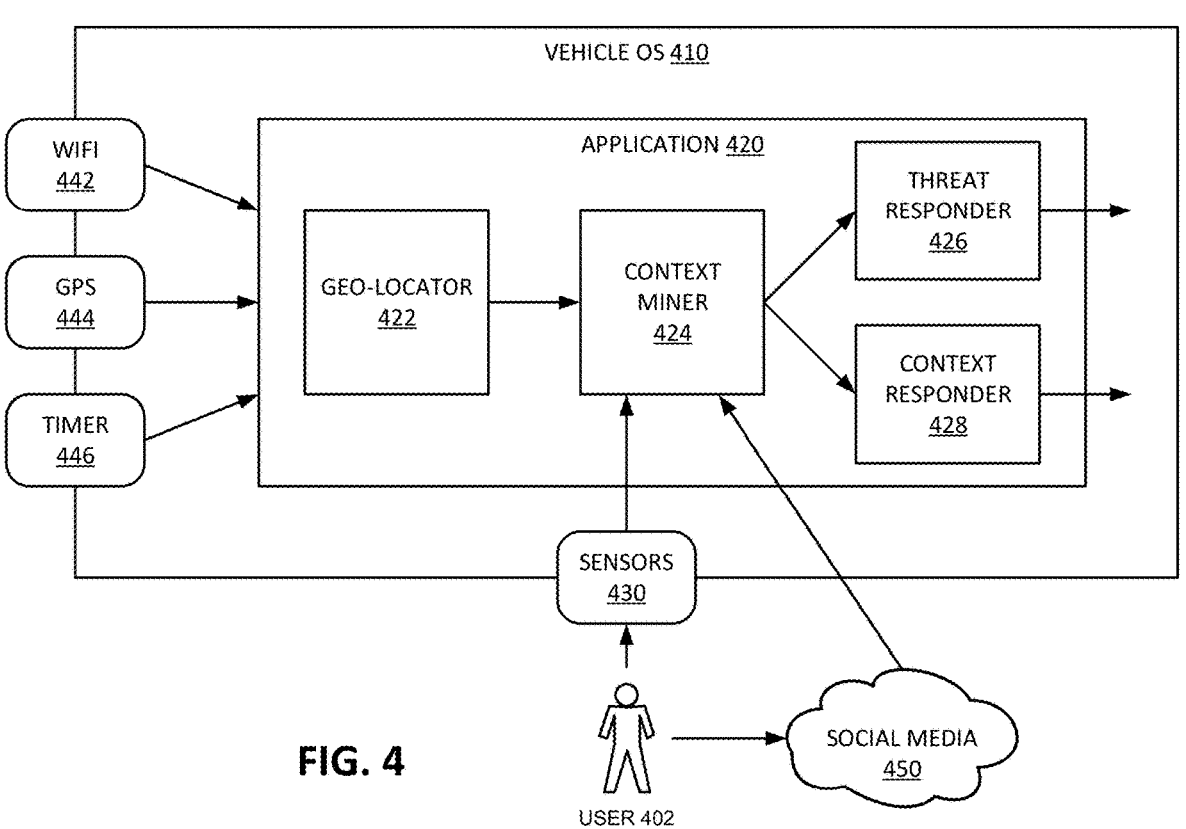
FIG. 4 is a block diagram of an embodiment of a vehicle operating system.

FIG. 4 is a block diagram of an embodiment of a vehicle operating system. System 400 represents elements of a system in which a management system detects vehicle context. System 400 can be in accordance with an embodiment of system 100 of FIG. 1 or system 200 of FIG. 2, or both. Vehicle OS 410 represents an operating system of a controller or processor of a hardware platform of a motor vehicle. OS 410 can control the execution of functions related to sensing and determining context and responding to context determinations. OS 410 can also control the execution of a dashboard system for user input and interaction, which can include an entertainment system.

In one embodiment, the context sensing and determination can be controlled via application 420 running under OS 410. Application 420 represents an embodiment of a logic routine that can execute within a software environment managed by OS 410. OS 410 can provide general services, executable routines, and operations to interface with hardware of the hardware platform of the motor vehicle. In one embodiment, application 420 can be a module within OS 410. In one embodiment, application 420 is a separate executable from OS 410.

System 400 includes one or more sensors 430, which can gather information about user 402 and otherwise about a context of the vehicle. In one embodiment, system 400 includes WiFi 442 to enable wireless communication from OS 410 to external sources. In one embodiment, system 400 includes GPS 444 to provide location services to be used by OS 410 or applications executing under OS 410, such as application 420. In one embodiment, system 400 includes one or more timers 446 to track relative timing of events.

It will be understood that OS 410 represents software and logic routines to control the operation of the hardware platform of the vehicle. OS 410 can include drivers, referring to specific software logic to control hardware components of system 400. For example, a driver for sensors 430 can apply settings to enable the operation of the sensors, and control how the sensors send data up to application 420 for use. In one embodiment, OS 410 includes drivers for one or more of sensors 430, WiFi 442, GPS 444, or timer 446. In one embodiment, at least one driver is included as a software module or agent executing under OS 410. In one embodiment, application 420 can include one or more drivers. While application 420 is illustrated as a software module executing under OS 410, it will be understood that any one or more components of application 420 can be executed in hardware logic, such as hard-coded logic or processor devices. It will also be understood that application 420 as a software module is executed by a hardware processing device of the vehicle; thus, application 420 can configure the processing components of the vehicle to perform various operations as described herein.

In one embodiment, application 420 includes geo-locator 422, which represents logic to compute a location of the vehicle. In one embodiment, application 420 includes context miner 424 to derive context information for one or more sensors 430, or social media 450, or a combination. In one embodiment, application 420 includes threat responder 426 to provide a response to a threat detected via context mining.

Geo-locator 422 represents logic to receive input from one or more of WiFi 442, GPS 444, or timer 446, or a combination, and determine a physical location of the vehicle in which OS 410 is incorporated and of which system 400 is a part. In one embodiment, geo-locator 422 computes a relative position, as in a relative position compared to a previous position. As such, geo-locator 422 can determine movement of the vehicle.

Context miner 424 represents logic to gather input data about location from geo-locator 422, as well as information about an operator, and determine a context of the vehicle. In one embodiment, context miner 424 connects to an external computation source, such as a cloud-based neural network. In one embodiment, sensors 430 determine information about user 402, and provide that information to context miner 424. In one embodiment, such information includes identity information about user 402. In one embodiment, such information includes biometric, identity, or device identification, or a combination. In one embodiment, context miner 424 identifies a threat context for security purposes and provides the context information to threat responder 426. In one embodiment, context miner 424 identifies a user context for purposes of customization of entertainment or car settings and provides the context information to context responder 428.

In one embodiment, threat responder 426 represents a response to increase or decrease security features based on context of the operator of the vehicle and location context for the vehicle. In one embodiment, threat responder 426 can provide a threat response in accordance to the threat levels described with respect to diagram 500 of FIG. 5, or a similar threat level architecture.

In one embodiment, context responder 428 provides context that can include security response. However, for purposes of system 400, threat responder 426 represents security response, and context responder 428 represents other types of responses to a detected context. For example, in one embodiment, context responder 428 can change seat and mirror positions or settings, configure entertainment options such as radio or music, configure environmental settings such as climate control, or provide other context.

In one embodiment, context miner 424 computes or derives context from sensors, audio (e.g., via microphone), GPS, and network connections. Connecting sensor settings with location-based awareness can lend added information and intelligence based on known locations. In one embodiment, system 400 assumes the car can be connected at all times or most of the time, and that a connectivity gap will not be likely. Adjustments to the context engine can factor in the likelihood of a connectivity gap. Context can include such determinations as, "the vehicle is in the parking lot of the mall", or "the vehicle is at home and it is nighttime", and any of a number of other contexts. In one embodiment, context miner 424 reports the context of time and location to the cloud for computation of context, with operator context. Such fusing of operator context and car context can provide more accurate inferences of theft situations from a security standpoint, and more accurately reflect car settings for a personal context.

In one embodiment, system 400 includes social media context information 450. Social media 450 refers to information that can identify mood or other user context. In one embodiment, sensors 430 include a video capture device, and context miner 424 or a cloud service includes a video processing engine to generate user context from the video capture, which can include operator recognition, and can include mood detection. In one embodiment, context miner 424 or a cloud service includes textual mining to discover the mood or inclination of an operator based on textual posts or video posts made to social media. Such context can identify the operator as impaired, for example, and aid in applying safe driving. In one embodiment, sensors 430 can include a video feed, and can automatically generate a video for posting by the operator to social media from the vehicle. In one embodiment, social media 450 enables vehicle OS 410 to identify social media contacts for a user. In one embodiment, a social media contact can opt-in to location services to enable identification by a vehicle of system 400. For example, social media profiles can be used to facilitate carpooling or meeting up at common locations. For example, vehicle OS 410 can identify a social media contact of user 402 that is along a route of the vehicle, and can be picked up.

In one embodiment, with a personal profile of a specific user, the vehicle can both adjust security settings via threat responder 426 in accordance with permissions for the user, as well as adjusting preference settings via context responder 428 based on preferences set in a personal profile. For example, application 420 can provide preferences such as preferred music/radio programs, suggesting specific routes with navigation systems in anticipation of next location based on calendar or social media or both, suggest reading news sites or other reading, or provide other preferences, or a combination. In one embodiment, context responder 428 can suggest carpooling with friends and acquaintances, make suggestions about setting up serendipitous meetings by discovering friends at a nearby location and suggesting a next destination, or other context derived from social media sources. In one embodiment, context miner 424 can generate navigation information for a traffic management application where the operator maintains a profile and uploads visual imagery of pictures taken along the drive.

In one embodiment, integration of calendar information into context miner 424 can enable application 420 to provide services such as automatically sending a message to a subsequent appointment to indicate a delay when the operator is predicted to be late to a meeting based on time and traffic conditions, or calling an individual based on calendar information and an indication by the operator of a next destination, from which context miner 424 can compute how long the operator is expected to be in the vehicle. It will be understood that other the very limited number of scenarios provided are only examples, and do not limit the scope and number of possible scenarios.

Figure 5:
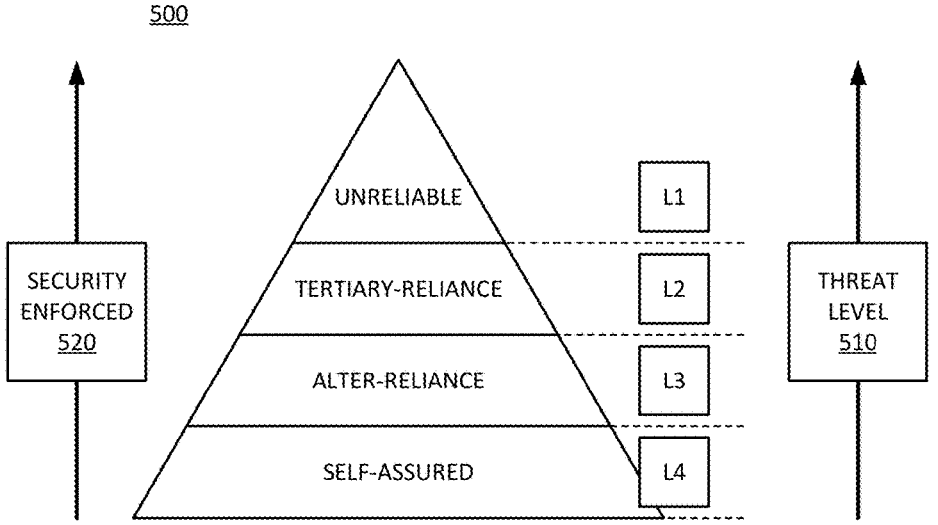
FIG. 5 is a block diagram of an embodiment of a threat level representation for a vehicle management system.

FIG. 5 is a block diagram of an embodiment of a threat level representation for a vehicle management system. Diagram 500 represents a decision mapping for threat levels 510 and security enforcement 520. As threat level 510 increase, the system can provide correspondingly increased security enforcement 520. Diagram 500 illustrates a recognition that threat levels from different vehicle users can increase from low threat to high threat, or easy enforcement to difficult enforcement. In one embodiment, the location and the context determined by the management system will determine the security response applied to the automobile.

Level 4 (L4) represents self-assured context. For example, at home or in an office parking lot of a "safe" or low crime neighborhood can be considered to provide self-assurance to the vehicle owner about safety of the vehicle. In one embodiment, the security settings for L4 can be relatively relaxed. Consider that the owner and vehicle are at a "home" location (e.g., the owner's place of residence) in a neighborhood that is not known for frequent carjacking, mugging, or property crimes. In such a context, in one embodiment, the management system provides routine security to protect the vehicle, such as ensuring the windows are raised and the doors are locked. Based on the neighborhood safety where the vehicle is parked, the management system can enforce correspondingly appropriate levels of security for the vehicle.

Level 3 (L3) represents alter-reliance context. Such a level is descriptive of the vast majority of locations where the vehicle will be used or parked. At level L3, an owner typically relies on another known device, such as an owner's own video camera mounted on the car, or a known person such as a designated security guard, or a trusted condition such as a fenced or restricted parking, for the safety of the vehicle. Examples can include parking outdoors at restaurants, shopping areas, or other public locations, or private locations such as repair shops. In one embodiment, in such a context the management system provides higher security than the self-assured workplace or home setting, which may still be lower than what would be at an unmonitored public location. For example, the management system can adapt to the context of L3 by performing one or more of the following: requiring a passcode to unlock the door, sending automated alerts to the owner's device (e.g., cellphone, tablet, or computer) whenever someone touches the vehicle, or other operations.

Level 2 (L2) represents tertiary-reliance context. Such a level provides a window between L3 (Alter-reliance) and L1 (Unreliable). A representative situation for level L2 can include a situation where the owner is required to watch the vehicle at a public location in the absence of the owner. In one embodiment, the management system can adapt to the context of L2, for example, by requiring multifactor authentication or a two-phase password for opening the door of the vehicle or starting the ignition.

Level 1 (L1) represents unreliable context. Such a level of context is representative of the vast majority of vehicles in neighborhoods considered to have crime rates above a threshold level, or other situations where the owner has little to no assurance of monitoring or security of the vehicle. In one embodiment, the management system increases vehicle security to adapt to such a context level, for example, by triggering high security measures. Such high security measures can include initiating a theft detection mechanism that will automatically clamp down the wheels or apply the brakes, require additional access control features for turning the vehicle on (e.g., biometric authenticated ignition, gear locking, locked hand brakes), or other security features, or a combination. In such a context, the management system can apply an automatic high-alert security, requiring much tighter controls for access.

Figure 6:
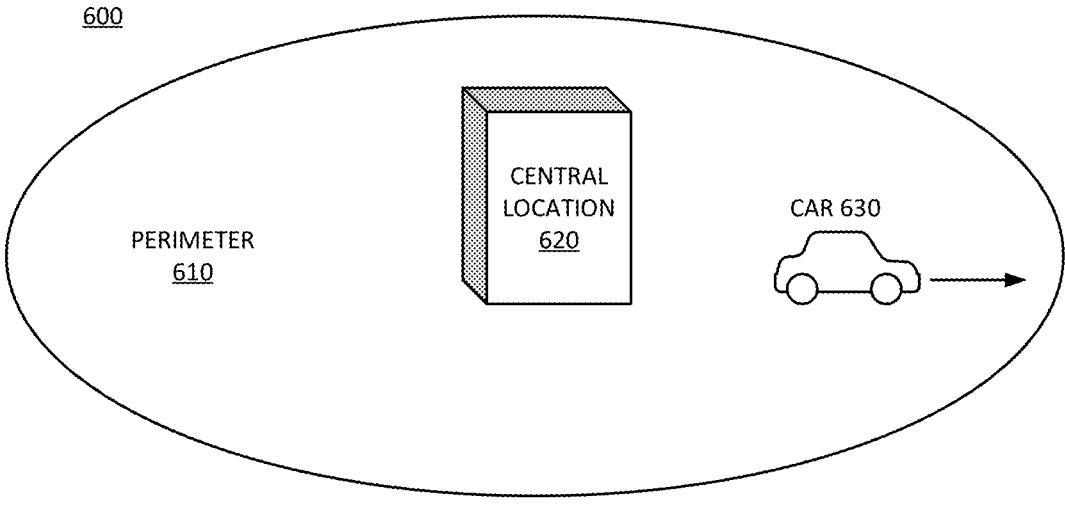
FIG. 6 is a diagrammatic representation of an embodiment of a known zone to inform contextual analysis of how a vehicle operating system manages the vehicle.

FIG. 6 is a diagrammatic representation of an embodiment of a known zone to inform contextual analysis of how a vehicle operating system manages the vehicle. System 600 provides one example of a "safe zone" or known zone scenario in accordance with any embodiment of a security application of context as described herein, such as with system 100 or system 200.

Perimeter 610 represents a known zone, which can be or include a specific distance from central location 620, or a specifically mapped out area (rather than a fixed distance) from central location 620. Central location 620 represents a home or work place or other place of known security for the vehicle. Car 630 represents a vehicle moving away from central location 620, and leaving perimeter 610. Car 630 can be any type of vehicle described herein. Car 630 includes a management system in accordance with any embodiment described herein.

The arrow from car 630 represents car 630 leaving perimeter 610. In one embodiment, the management system of car 630 provides adaptive security in motion. Consider that perimeter 610 represents a known safe area or an area of known security, where outside of perimeter 610 represents a location of unknown or lower security. In one embodiment, as car 630 leaves perimeter 610, the management system can automatically enable higher security features, such as automatically enabling window lock, auto-shading windows, initiating video monitoring on a rear facing camera, or other features, or a combination. For example, perimeter 610 may represent an area of L4 or L3 security levels, and outside the perimeter represents L2 or L1 security levels (referring to what is illustrated in FIG. 5). The transition from a zone associated with one security level to a zone associated with a different security level can trigger the management system to automatically adjust security responses based on the change in contexts.

In one embodiment, the automatic security enabling or disabling features in response to changing security zones can be in addition to allowing an operator or owner to selectively enable security features and threat alert operations. In one embodiment, the management system can identify the change in security contexts and query the operator if the operator would like to adjust the security settings. In one embodiment, the management system can notify the owner of a change to security context and query the owner for a change in security operations.

Figure 7:
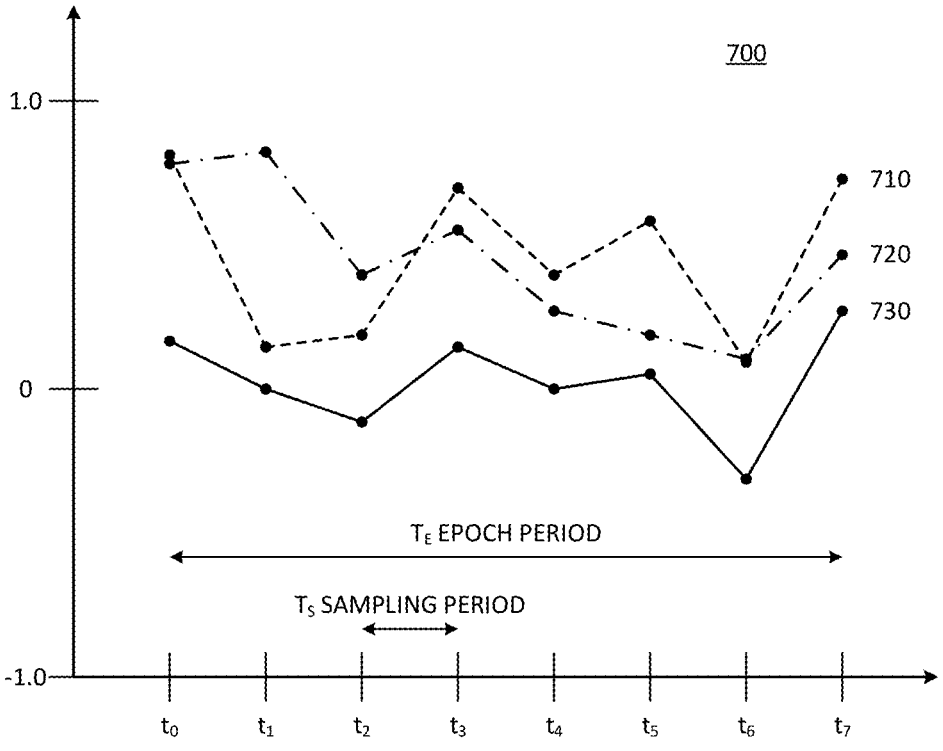
FIG. 7 is a diagrammatic representation of an embodiment of cross-correlation for a period of time.

FIG. 7 is a diagrammatic representation of an embodiment of cross-correlation for a period of time. Diagram 700 represents a comparison of various curves. Curve 710 represents a normalized gyroscope output over 8 $T_S$ sampling period over an epoch period of $T_E$. Curve 720 represents a plotting of sample points for a normalized temperature output over the same epoch of sampling periods. Curve 730 represents a plotting of samples for cross-correlation between curves 710 and 720, or between gyroscope output data and temperature output data.

The normalized output ensures that the data falls between zero and one. The cross-correlation can be positive or negative, as illustrated by curve 730. In one embodiment, the engine that computes the context determinations, whether in-vehicle processing resources or cloud-based processing resources or a combination, computes a cross-correlation among the sensed channels. Each sensor data output represents a different sensed channel. In one embodiment, to determine the cross correlation between two sensed parameters x and y, the processor computes covariance $c_{xy}$ between parameters x and y as follows:

$$c_{xy}(k) = \begin{cases} \dfrac{1}{n}\displaystyle\sum_{t=1}^{n-k}(x_t - \bar{x})(y_{t+k} - \bar{y}) & k = 0, 1, 2, \dots \\ \dfrac{1}{n}\displaystyle\sum_{t=q}^{n+k}(y_t - \bar{y})(x_{t-k} - \bar{x}) & k = 0, -1, -2, \dots \end{cases}$$

In one embodiment, the processor computes the cross-correlation $r_{xy}$ as follows:

$$r_{xy}(k) = \frac{c_{xy}(k)}{s_x s_y} \quad k = 0, \pm 1, \pm 2, \dots$$

Where $s_x$ and $s_y$ are defined as:

$$s_x = \sqrt{c_{xx}(0)}$$
$$s_y = \sqrt{c_{yy}(0)}$$

In one embodiment, the processor performs machine learning or unsupervised learning. Unsupervised learning techniques enable the processor to find natural groupings and patterns in data. Unsupervised learning can alternatively be referred to as cluster analysis, segmentation analysis, or taxonomy analysis. Unsupervised learning partitions sample data into groups or clusters. The processing forms clusters of objects where all objects in the same cluster are similar, and objects in different clusters are distinct from each other. Clustering techniques generally use measures of similarity or dissimilarity, referred to as distance measures, to create the clusters. In one embodiment, one distance measure can be the vector distance between cross-correlation at each epoch period.

In one embodiment, the processor can execute a separate procedure referred to as cluster evaluation to help determine the optimal number of clusters (M) for the data using different evaluation criteria. In one embodiment, the number M of clusters can also be supplied as a constraint to the unsupervised neural network training procedure to cause the sample data to be categorized into one of M categories. While certain descriptions refer specifically to unsupervised learning, an unsupervised learning neural network is only one of several methods that can be applied to implement a contextual sensing engine for threat classification. In one embodiment, the processor applies auto-regression instead of unsupervised learning. In one embodiment, the processor can perform multi-variable auto-regression splines. In one embodiment, the processor can perform non-linear regression.

Figure 8:
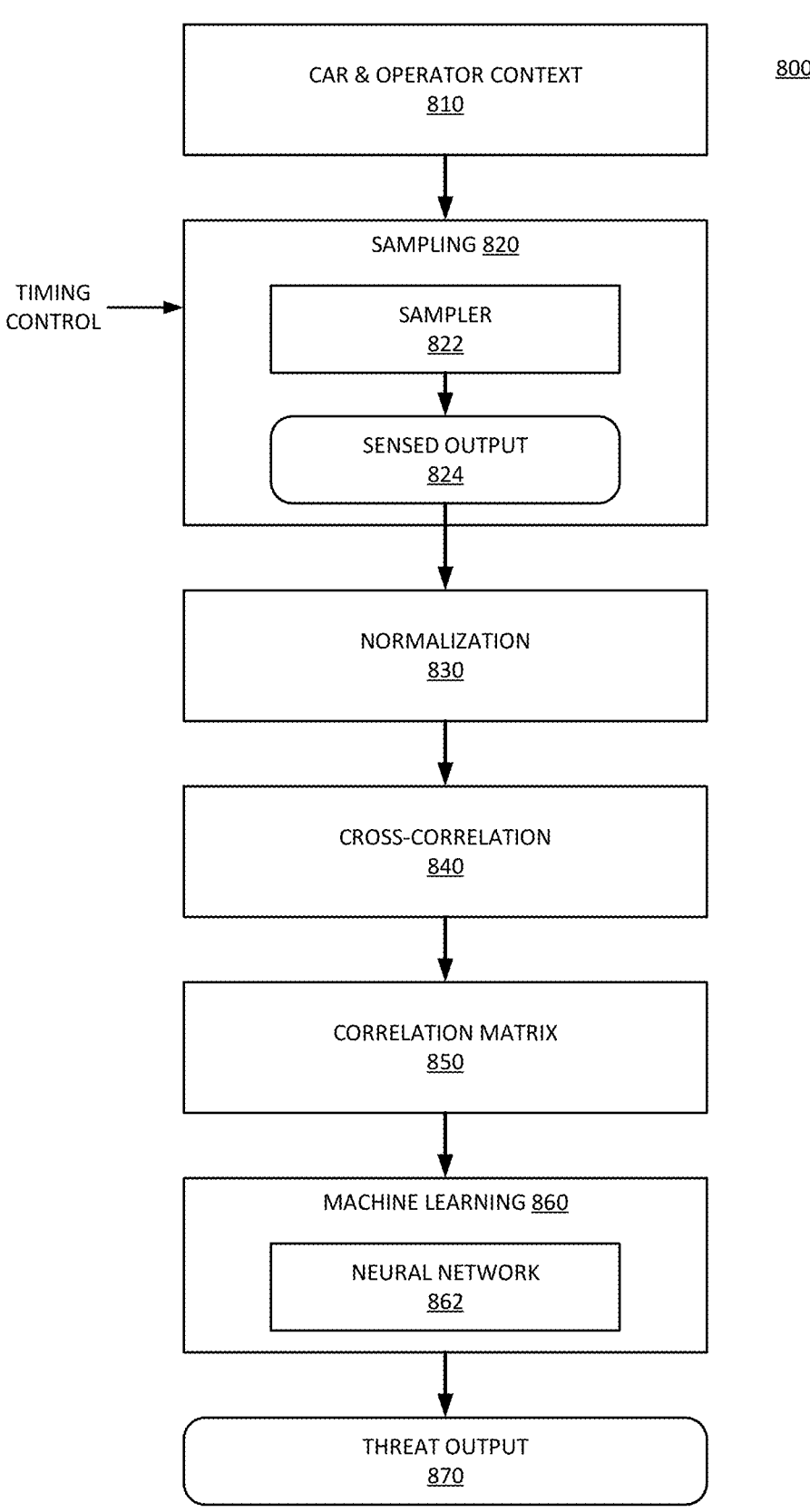
FIG. 8 is a block diagram of an embodiment of a theft threat detection system that computes a threat category based on a neural network analysis.

FIG. 8 is a block diagram of an embodiment of a theft threat detection system that computes a threat category based on a neural network analysis. System 800 provides one example of operations of a management system that performs threat determination based on context, in accordance with an embodiment of system 100.

In one embodiment, system 800 initiates with a user or operator and a car or motor vehicle having a context based on who the user is, where the vehicle is, and timing information in accordance with any timing information described herein. In one embodiment, a management system includes sampling features 820, including one or more samplers 822 to interface with one or more sensor devices. In one embodiment, sampling 820 samples sensors such as video or image capture, light sensors, audio sensors (e.g., capturing ambient noise from a microphone), touch sensors, GPS, or other sensors). Other sensor triggers can be considered to include user calendar activity, email text (e.g., captured as sentiment and frequency), audio or music activity, or other triggers, or a combination.

Sampler 822 generates sensed output 824 to represent data received from a sensor device. In one embodiment, sampling 820 receives timing control to control the sampling of sampler 822. In one embodiment, sampler 822 executes sampling in accordance with a time $T_S$, or a sampling period. In one embodiment, sensed output 824 acts as an epoch collector, which receives the sampled data from various sensor streams. In one embodiment, sensed output 824 collects sampled data for a duration $T_E$, which is an integral multiple of sampling period $T_S$. In one embodiment, the epoch period is defined as the minimum duration of sensed data needed for the management system to detect a change in the threat level.

In one embodiment, sampler 822 gathers raw sampled sensor data over an epoch, and the management system includes normalization logic 830 to normalize the sensed data relative to the maximum value in each sensor data stream. Data normalization harmonizes data streams from various channels. It will be understood that comparison of data may not be meaningful if the various data streams have different scales. Thus, each sensing channel or data output from different sensors can include its own minimum and maximum values. Normalization 830 can make the minimum and maximum values in each sensed channel 0.0 and 1.0, respectively. Thus, all sensor data can be compared to other sensor data on a relative scale.

In one embodiment, system 800 includes cross-correlation processing 840 to compute context from the normalized sensor input data. In one embodiment, cross-correlation 840 performs pair-wise cross-correlation on sensor data inputs to generate correlation matrix 850. FIG. 9 includes an example of a cross-correlation matrix. Correlation matrix 850 represents computations that can indicate relationships between sensor inputs, from which the processor can infer context. In one embodiment, correlation matrix 850 includes a correlation matrix for multiple sampling periods in an epoch. Thus, the processor can compare the correlation of the data over time.

In one embodiment, system 800 includes machine learning 860 to compute inferences from the sensor data. In one embodiment, machine learning 860 includes neural network 862 to compute the inferences. Examples of machine learning can include winner-takes-all clustering processing or self-organizing mapping, or other technique. Neural network 862 can be referred to as a Bayesian network, and can thus be referred to as a Bayesian context mining engine. In one embodiment, neural network 862 infers risk in response to receiving input data. In one embodiment, the management system includes a library function call to a service that computes the risk assessment via network access to machine learning 860. In response to context inferred, which can include risk context or threat context, the management system can generate threat output 870. Threat output includes the capability to generate alerts or execute security operations based on vehicle systems, or both. In one embodiment, the management system generates threat output 870 and responds to the threat context based on tiers of security, from self-assured to unreliable.

FIG. 9 is a block diagram of an embodiment of a correlation matrix for computing a threat category for vehicle theft prevention based on context data. Correlation matrix 900 provides one example of a correlation matrix in accordance with system 800 of FIG. 8. The columns of matrix 900 identify multiple sensor triggers, such as temperature, pressure, touchscreen activity, proximity, microphone, gyroscope, location feed, and social media activity. It will be understood that these are merely examples, and the management system can use different or more sensor triggers. It will be observed that the rows match the same sensor triggers. Thus, there is a perfect correlation of 1.00 across the intersection of columns with corresponding rows.

The other values illustrate computations performed for one example system with measured input. For purposes of illustration only, correlation values have been identified with shading based on values. Dark shading corresponds to lower correlation, and lighter shading to higher correlation. The darkest shading corresponds to the most negative correlation values, and the lightest shading to the highest correlation values. This is merely a convention to illustrate how different sensors correlate differently, and is not meant to imply or convey other information.

In one embodiment, a processing units generates correlation matrix 900 subsequent to normalization of each sensed channel by cross-correlating each pair of sensed channels. In one embodiment, correlation matrix 900 illustrates the mutual cross-correlation between each pair of sensed channels once computed for a given epoch period. In one embodiment, the processor collects correlation matrix 900 over multiple epochs to feed into a neural-network (NN), such as an unsupervised learning machine, to determine the relevance of each sensed parameter to the bigger context of the vehicle and the operator.

Figure 10:
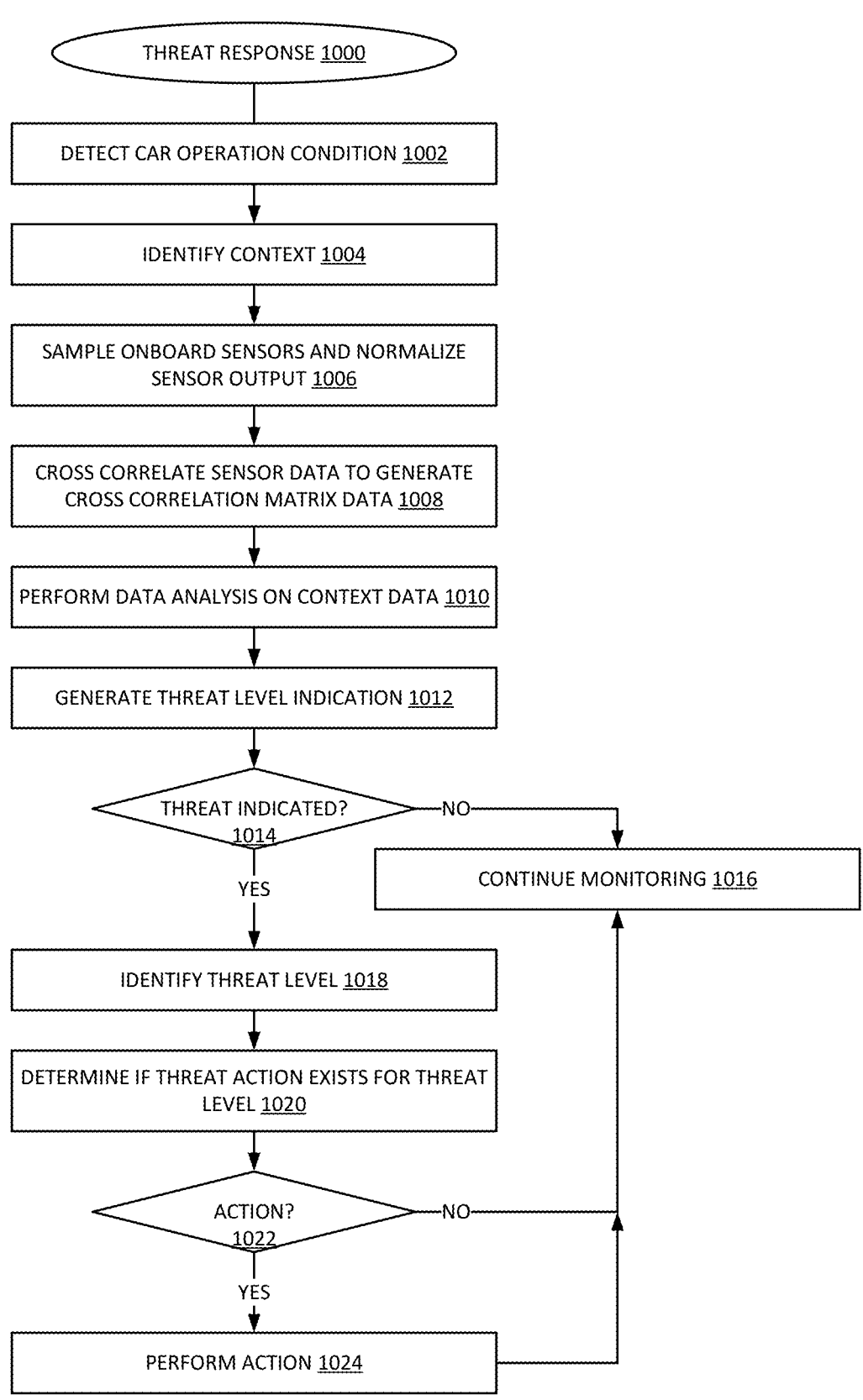
FIG. 10 is a flow diagram of an embodiment of a process for providing vehicle theft threat response based on contextual information.

FIG. 10 is a flow diagram of an embodiment of a process for providing vehicle theft threat response based on contextual information. Process 1000 provides one example of a flow for threat determination and response that can be performed by a management system in accordance with an embodiment. In one embodiment, the vehicle includes sensors coupled to the management system that enable the management system to detect an operation condition of the car, 1002. An operation condition can refer to any use or attempted use of the vehicle. It can also include handling of the vehicle or movement of the vehicle that occurs without attempting entry in the vehicle. An operation condition can include attempting to start or drive the vehicle, or use one or more systems or components of the vehicle.

In one embodiment, the management system identifies a context of the car, 1004. The context can include timing information, location information, and operator identity if discoverable. To the extent that operator identity cannot be discovered, the management system may flag the context as more likely to be a threat since an unknown operator is attempting use. The management system can identify the context by accessing sensor data or in addition to accessing sensor data. In one embodiment, the management system samples onboard sensors and normalizes the sensor output, 1006. Onboard sensors refer to sensors built into the vehicle or connected into the vehicle, and which connect to the management system via the hardware platform and software platform of the vehicle.

In one embodiment, the management system includes hardware resources to perform computations within the vehicle. In one embodiment, the management system accesses hardware processing resources through a network link. In either case, or in the case of a combination of these, the management system cross correlates sensor data to generate a cross correlation matrix of data, 1008. In one embodiment, a machine learning processing system or processing engine, which may typically be located external to the vehicle, performs data analysis on the context data to determine what can be inferred from the data, 1010. In one embodiment, the processing engine generates a threat level indication based on the context data analysis, 1012.

In one embodiment, if a threat is not indicated or if a change in threat level is not detected, 1014 NO branch, the management system continues to monitor the context information, 1016. In one embodiment, if a threat is indicated by the analysis or if a change in threat level is detected, 1014 YES branch, the management system can identify the new threat level, 1018. The management system can determine if one or more threat action operations exist for the threat level indicated, 1020. If all security operations have already been applied, 1022 NO branch, the management system does not need to take further action, and continues to monitor the context data, 1016. If a security operation is identified that has not been applied, 1022 YES branch, the management system takes action to execute the identified operation, 1024. The management system can then continue monitoring, 1016.

In one aspect, a motor vehicle management system includes: sensing equipment of the motor vehicle to detect an identity of an operator of the motor vehicle and location information of the motor vehicle; and a processing unit to identify a context for the motor vehicle based at least in part on data from the sensing equipment and time information, determine permissions for the operator based on the identified context, and execute a threat alert operation based on a determination that the identified context violates the permissions for the operator.

In one embodiment, the sensing equipment comprises a vehicle local area network system. In one embodiment, the sensing equipment comprises a biometric sensor. In one embodiment, the sensing equipment is to identify a wireless device of the operator. In one embodiment, the processing unit is further to access social media information for the operator to identify the context. In one embodiment, the processing unit is further to access calendar information for the operator to identify the context. In one embodiment, the time information includes time of day, an amount of time since the operator left the motor vehicle, or a combination. In one embodiment, the permissions are based on a time, or a place, or a combination. In one embodiment, the processing unit is to selectively enable threat alert operations based on input from an owner of the motor vehicle. In one embodiment, the processing unit is to identify the context based on a neural network correlation analysis of sensor and context data. In one embodiment, the neural network analysis comprises a neural network analysis by a cloud-based processing unit communicatively coupled to the processing unit.

In one aspect, a method for theft protection of a motor vehicle includes: identifying a context for a motor vehicle at a controller of the motor vehicle, including an identity of an operator of the motor vehicle, a time, and a location of the motor vehicle, the identifying based at least in part on sensing hardware of the motor vehicle; determining permissions for the operator based on the identified context; and executing a threat alert operation based on a determination that the identified context violates the permissions for the operator.

In one embodiment, identifying the context comprises identifying a wireless network via a vehicle local area network system. In one embodiment, identifying the context comprises identifying the operator via a biometric sensor. In one embodiment, identifying the context comprises identifying a wireless device of the operator. In one embodiment, identifying the context comprises accessing calendar information for the operator to identify the context. In one embodiment, identifying the context comprises accessing social media context for the operator. In one embodiment, identifying the context comprises identifying time information including time of day, an amount of time since the operator left the motor vehicle, or a combination. In one embodiment, executing the threat alert operation comprises automatically enabling one or more security features in response to a change of location context of the vehicle. In one embodiment, identifying the context comprises identifying the context based on a neural network correlation analysis of sensor and context data. In one embodiment, the permissions are based on a time, or a place, or a combination. In one embodiment, executing the threat alert operation comprises selectively enabling threat alert operations based on input from an owner of the motor vehicle.

In one aspect, an apparatus comprising means for performing operations to execute a method for theft protection of a motor vehicle in accordance with any embodiment above. In one aspect, an article of manufacture comprising computer readable storage medium having content stored thereon, which when accessed provides instructions to cause a machine to perform operations to execute a method for theft protection of a motor vehicle in accordance with any embodiment above.

In one aspect, a motor vehicle management system includes: sensing equipment of the motor vehicle to detect an identity of an operator of the motor vehicle; an interface to a social media source associated with the operator; and a processing unit to identify a context for the motor vehicle based at least in part on the identity of the operator and data from the social media source, the processing unit to configure at least one setting of the motor vehicle in response to the context.

In one embodiment, the sensing equipment comprises a vehicle local area network system. In one embodiment, the sensing equipment comprises a biometric sensor. In one embodiment, the sensing equipment is to identify a wireless device of the operator. In one embodiment, the processing unit is to configure at least one entertainment system setting based on the context. In one embodiment, the processing unit is to execute a safety feature of the vehicle based on the context. In one embodiment, the interface to the social media source comprises an interface to a social network application. In one embodiment, the processing unit is further to identify a social media contact of the operator along a route of the motor vehicle.

In one aspect, a method for responding to a context in a motor vehicle includes: detecting, with sensing equipment in the motor vehicle, an identity of an operator of the motor vehicle; accessing a social media source associated with the operator; and identifying a context for the motor vehicle based at least in part on the identity of the operator and data from the social media source, including configuring at least one setting of the motor vehicle in response to the context.

In one embodiment, the sensing equipment comprises a vehicle local area network system. In one embodiment, the sensing equipment comprises a biometric sensor. In one embodiment, the sensing equipment is to identify a wireless device of the operator. In one embodiment, the processing unit is to configure at least one entertainment system setting based on the context. In one embodiment, the processing unit is to execute a safety feature of the vehicle based on the context. In one embodiment, the interface to the social media source comprises an interface to a social network application. In one embodiment, the processing unit is further to identify a social media contact of the operator along a route of the motor vehicle.

In one aspect, an apparatus comprising means for performing operations to execute a method for responding to a context in a motor vehicle in accordance with any embodiment above. In one aspect, an article of manufacture comprising computer readable storage medium having content stored thereon, which when accessed provides instructions to cause a machine to perform operations to execute a method for responding to a context in a motor vehicle in accordance with any embodiment above.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A security management system for a vehicle, the security management system comprising:
a first sensor;
a second sensor; and
at least one processor operable to:
evaluate a first factor of a two-factor authentication protocol to validate a user, with operations to:
attempt a first recognition of the user based on biometric data from the first sensor presented by the user outside the vehicle, wherein the first sensor is a camera, and wherein the first recognition of the user includes validating the user with facial recognition of a camera image; and
determine a failure or a success of the first factor from the attempt of the first recognition of the user;
unlock a door of the vehicle in response to the success of the first factor;
evaluate a second factor of the two-factor authentication protocol to validate the user, after the success of the first factor, with operations to:
attempt a second recognition of the user based on biometric data from the second sensor presented by the user inside the vehicle, wherein the second sensor is a touch sensor located inside the vehicle configured to receive a fingerprint biometric from the user, and wherein the second recognition of the user includes validating the user as an operator of the vehicle based on the fingerprint biometric of the user; and determine a failure or a success of the second factor from the attempt of the second recognition of the user;
apply a first context to restrict use of the vehicle and a driving feature, in response to the failure of the second factor; and
apply a second context to authorize use of the vehicle and the driving feature, in response to the success of the second factor.

2. The security management system of claim 1, wherein the second factor is evaluated in response to a command to start the vehicle.

3. The security management system of claim 1, wherein the first context to restrict the use of the driving feature prevents drive movement of the vehicle.

4. The security management system of claim 1, wherein the second context to authorize the use of the driving feature starts the vehicle and enables drive movement of the vehicle.

5. The security management system of claim 1, wherein the facial recognition is performed based on use of a neural network.

6. A non-transitory computer-readable storage medium capable of storing instructions that, when executed, cause at least one processing device of a security management system to:
evaluate a first factor of a two-factor authentication protocol to validate a user, with operations to:
attempt a first recognition of the user based on biometric data from a first sensor of a vehicle presented by the user outside the vehicle, wherein the first sensor is a camera, and wherein the first recognition of the user includes validating the user with facial recognition of a camera image; and
determine a failure or a success of the first factor from the attempt of the first recognition of the user;
unlock a door of the vehicle in response to the success of the first factor;
evaluate a second factor of the two-factor authentication protocol to validate the user, after the success of the first factor, with operations to:
attempt a second recognition of the user based on biometric data from a second sensor of the vehicle presented by the user inside the vehicle, wherein the second sensor is a touch sensor located inside the vehicle configured to receive a fingerprint biometric from the user, and wherein the second recognition of the user includes validating the user as an operator of the vehicle based on the fingerprint biometric of the user; and
determine a failure or a success of the second factor from the attempt of the second recognition of the user;
apply a first context to restrict use of the vehicle and a driving feature, in response to the failure of the second factor; and
apply a second context to authorize use of the vehicle and the driving feature, in response to the success of the second factor.

7. The non-transitory computer-readable storage medium of claim 6, wherein the second factor is evaluated in response to a command to start the vehicle.

8. The non-transitory computer-readable storage medium of claim 6, wherein the first context to restrict the use of the driving feature prevents drive movement of the vehicle.

9. The non-transitory computer-readable storage medium of claim 6, wherein the second context to authorize the use of the driving feature starts the vehicle and enables drive movement of the vehicle.

10. The non-transitory computer-readable storage medium of claim 6, wherein the facial recognition is performed based on use of a neural network.

11. An apparatus for a vehicle, comprising:

a first sensing means for capturing first biometric data of a user, wherein the first biometric data includes a camera image;

a second sensing means for capturing second biometric data of the user, wherein the second biometric data includes fingerprint data; and processing means for:

initiating a first factor of a two-factor authentication protocol to validate the user, by:

attempting a first recognition of the user based on the first biometric data from the first sensing means, wherein the first biometric data is presented by the user outside the vehicle, and wherein the first recognition of the user includes validating the user with facial recognition of the camera image captured by the first sensing means; and determining a failure or a success of the first factor from the attempt of the first recognition of the user;

causing a door of the vehicle to be unlocked in response to the success of the first factor;

initiating a second factor of the two-factor authentication protocol to validate the user, after the success of the first factor, by:

attempting a second recognition of the user based on the second biometric data from the second sensing means, wherein the second biometric data is presented by the user to the second sensing means inside the vehicle, wherein the second sensing means is configured to receive a fingerprint biometric from the user, and wherein the second recognition of the user includes validating the user as an operator of the vehicle based on the fingerprint biometric of the user; and determining a failure or a success of the second factor from the attempt of the second recognition of the user;

applying a first context to restrict use of the vehicle and a driving feature, in response to the failure of the second factor; and applying a second context to authorize use of the vehicle and the driving feature, in response to the success of the second factor.

12. The apparatus of claim 11, wherein the first factor is evaluated in response to a first command to unlock the door, and wherein the second factor is evaluated in response to a second command to start the vehicle.

13. The apparatus of claim 11, wherein the first context to restrict the use of the driving feature prevents drive movement of the vehicle, and wherein the second context to authorize the use of the driving feature starts the vehicle and enables drive movement of the vehicle.

* * * * *